US010279274B1

(12) United States Patent
Brister et al.

(10) Patent No.: US 10,279,274 B1
(45) Date of Patent: May 7, 2019

(54) TURNTABLE-MOUNTED ROBOTIC ARM RIDE SYSTEM

(71) Applicant: Thinkwell Group, Inc., Los Angeles, CA (US)

(72) Inventors: Michael Keith Brister, Orlando, FL (US); Clifton Amir Montgomery, Orlando, FL (US); Craig Robert Hanna, Los Angeles, CA (US)

(73) Assignee: Thinkwell Group, Inc., Los Angeles, CA (US)

( * ) Notice: Subject to any disclaimer, the term of this patent is extended or adjusted under 35 U.S.C. 154(b) by 0 days.

(21) Appl. No.: 15/482,695

(22) Filed: Apr. 7, 2017

Related U.S. Application Data

(60) Provisional application No. 62/320,356, filed on Apr. 8, 2016, provisional application No. 62/339,626, filed on May 20, 2016.

(51) Int. Cl.
| | | |
|---|---|---|
| *A63G 31/16* | (2006.01) | |
| *A63G 1/30* | (2006.01) | |
| *A63G 1/10* | (2006.01) | |
| *A63G 1/48* | (2006.01) | |
| *G01C 19/42* | (2006.01) | |
| *G01P 3/44* | (2006.01) | |
| *G01P 13/00* | (2006.01) | |

(52) U.S. Cl.
CPC ............ *A63G 1/30* (2013.01); *A63G 1/10* (2013.01); *A63G 1/48* (2013.01); *G01C 19/42* (2013.01); *G01P 3/44* (2013.01); *G01P 13/00* (2013.01)

(58) Field of Classification Search
CPC ........ A63G 31/00; A63G 31/02; A63G 31/10; A63G 31/12; A63G 31/16; A63G 1/00; A63G 1/24

USPC ............ 472/40, 43, 59–61, 130; 434/29, 55
See application file for complete search history.

(56) References Cited

U.S. PATENT DOCUMENTS

| 5,316,480 A * | 5/1994 | Ellsworth | A63G 31/16 434/29 |
|---|---|---|---|
| 6,007,338 A | 12/1999 | Dinunzio | |
| 6,776,722 B2 * | 8/2004 | De-Gol | A63G 31/16 434/55 |

(Continued)

OTHER PUBLICATIONS

Author Unknown, Kuka Coaster: 6-Axis Robot as an Amusement Ride, Apr. 5, 2017, https://www.kuka.com/en-de/industries/other-industries/entertainment-industry/entertainment-robotics-kuka-coaster.

(Continued)

*Primary Examiner* — Kien T Nguyen
(74) *Attorney, Agent, or Firm* — Van Pelt, Yi & James LLP

(57) ABSTRACT

In various embodiments, a ride system includes a turntable, a multi-axis motion device, and a control system. The multi-axis motion device may be mounted in a fixed position on the turntable. The control system may be configured to manipulate the turntable and the multi-axis motion device in synchronization with an environment of the ride system. In various embodiments, the control system includes a processor and a memory coupled to the processor, where the memory is configured to store a ride experience command sequence. The processor may be configured to use a turntable motor controller to manipulate a turntable to execute a ride experience command sequence and use the motion device controller to manipulate a multi-axis motion device to execute the ride experience command sequence.

21 Claims, 13 Drawing Sheets

(56) References Cited

U.S. PATENT DOCUMENTS

| | | | | |
|---|---|---|---|---|
| 7,094,157 B2 * | 8/2006 | Fromyer | ................ | A63G 31/12 |
| | | | | 434/55 |
| 8,348,776 B2 * | 1/2013 | Crawford | ............... | A63G 31/02 |
| | | | | 104/77 |
| 8,864,592 B2 * | 10/2014 | Baxter | ..................... | A63G 1/10 |
| | | | | 472/31 |
| 8,926,441 B2 * | 1/2015 | Fox | ......................... | H04R 1/02 |
| | | | | 472/136 |

OTHER PUBLICATIONS

Author Unknown, RoboCoaster, Wikipedia, Apr. 5, 2017, https://en.wikipedia.org/wiki/RoboCoaster.

* cited by examiner

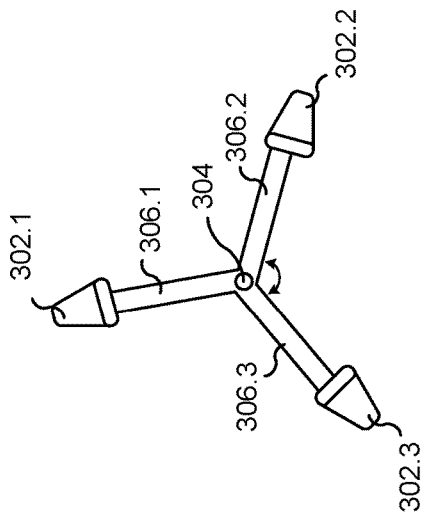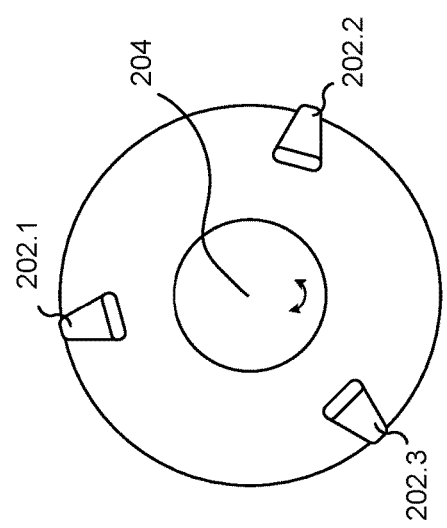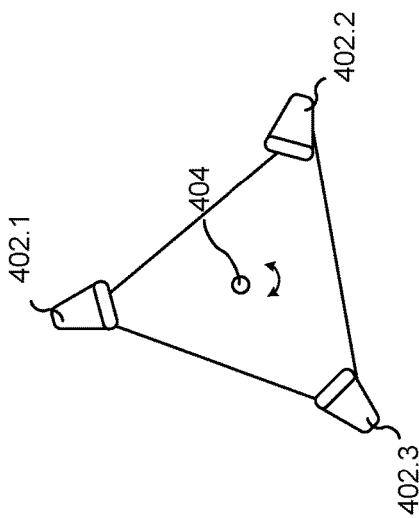

600

700

800

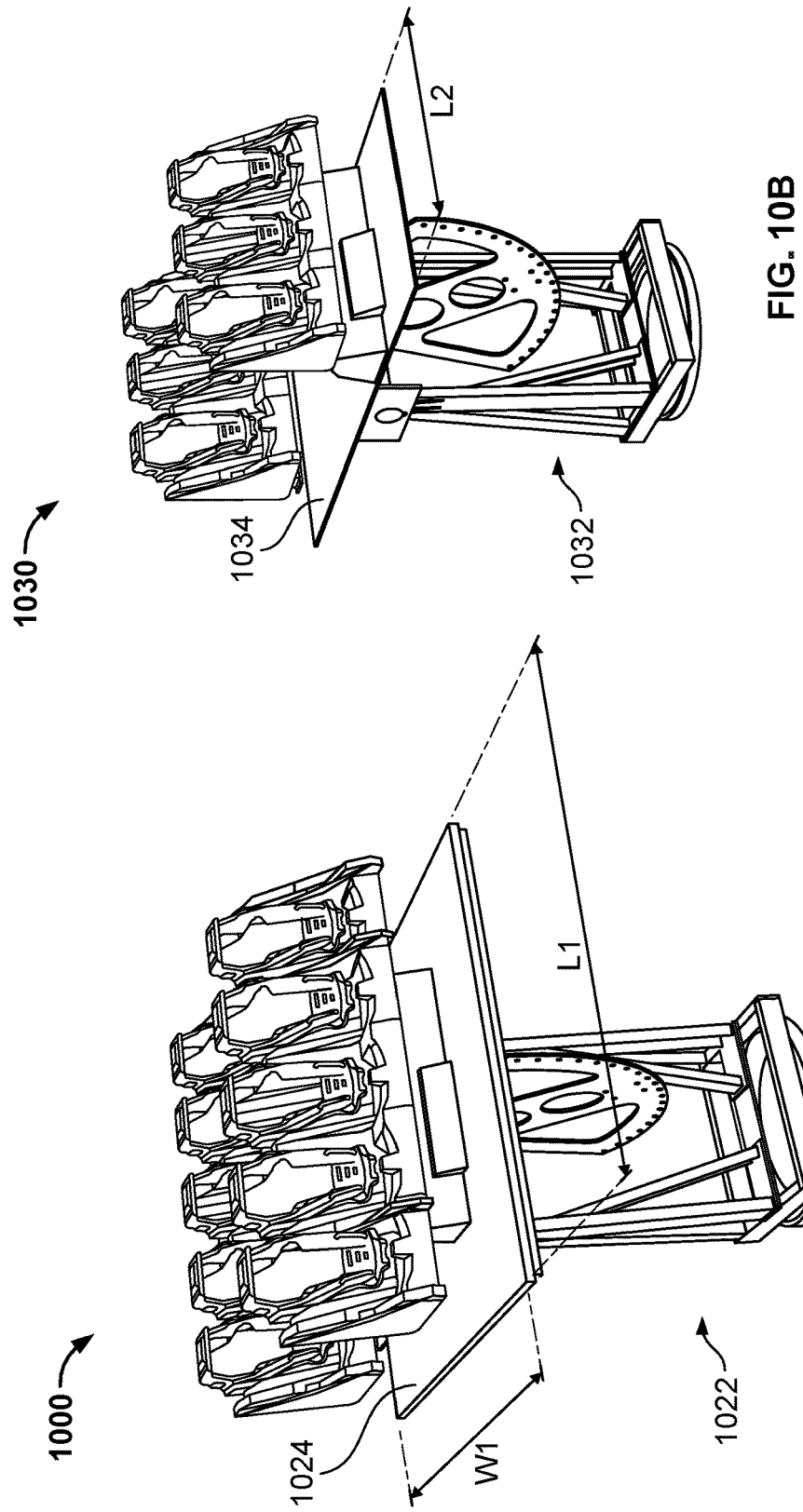

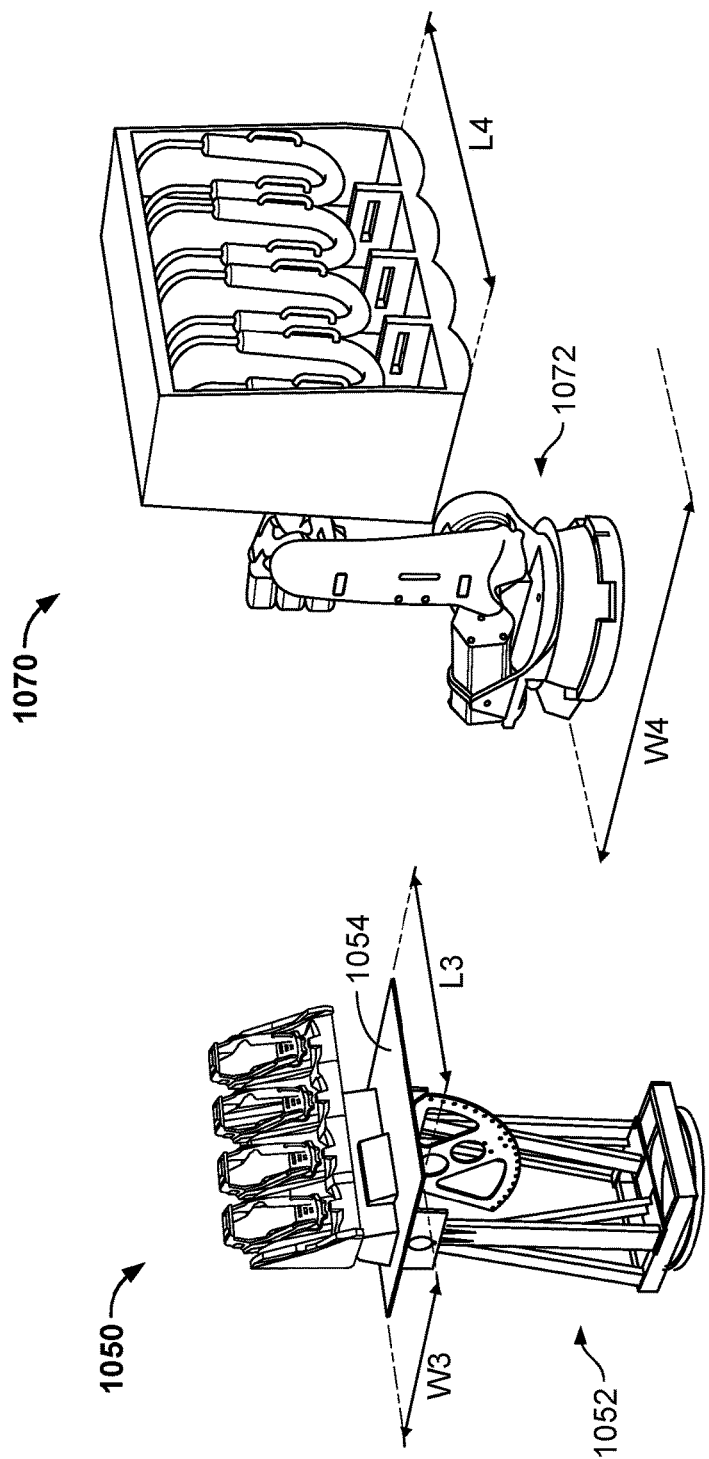

1400

1430

1450

US 10,279,274 B1

TURNTABLE-MOUNTED ROBOTIC ARM RIDE SYSTEM

CROSS REFERENCE TO OTHER APPLICATIONS

This application claims priority to U.S. Provisional Patent Application No. 62/320,356 entitled TURNTABLE-MOUNTED ROBOTIC ARM RIDE SYSTEM filed Apr. 8, 2016 which is incorporated herein by reference for all purposes. This application also claims priority to U.S. Provisional Patent Application No. 62/339,626 entitled TURNTABLE-MOUNTED DYNAMIC MOTION RIDE SYSTEM filed May 20, 2016 which is incorporated herein by reference for all purposes

BACKGROUND OF THE INVENTION

Conventional amusement park ride systems are popular but expensive to implement. Their popularity is evidenced by the increasing wait times for rides in theme parks. Conventional amusement park rides may require substantial real estate and space to lay down tracks. The individual systems of propulsion on the tracks may be difficult to engineer and may be dangerous where the propulsion systems reach great heights or great speeds. In addition, ride systems have limited capacity.

BRIEF DESCRIPTION OF THE DRAWINGS

Various embodiments of the invention are disclosed in the following detailed description and the accompanying drawings.

FIG. 2 is a block diagram illustrating an embodiment of a turntable for a dynamic motion ride system.

FIG. 3 is a block diagram illustrating an embodiment of a turntable for a dynamic motion ride system.

FIG. 4 is a block diagram illustrating an embodiment of a turntable for a dynamic motion ride system.

FIG. 10A is a block diagram illustrating an embodiment of vehicle for a dynamic motion ride system.

FIG. 10B is a block diagram illustrating an embodiment of vehicle for a dynamic motion ride system.

FIG. 10C is a block diagram illustrating an embodiment of vehicle for a dynamic motion ride system.

FIG. 10D is a block diagram illustrating an embodiment of vehicle for a dynamic motion ride system.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A dynamic motion ride system is disclosed. In various embodiments, the dynamic motion ride system includes a unique combination of amusement park attraction ride vehicles where guests ride in cabins attached to multi-axis motion devices mounted at intervals around a rotating turntable. The dynamic motion ride may use existing motion vehicle ride technology and/or be implemented using one or more other techniques further described herein. In various embodiments, each of the plurality of vehicles may be mounted at even intervals around a turntable. Each vehicle may be mounted to the top of a multi-axis motion device mounted in a fixed position on the turntable. The turntable may be coupled to be rotated about an axis that is substantially perpendicular to a plane in which the turntable is oriented.

Figure 1:
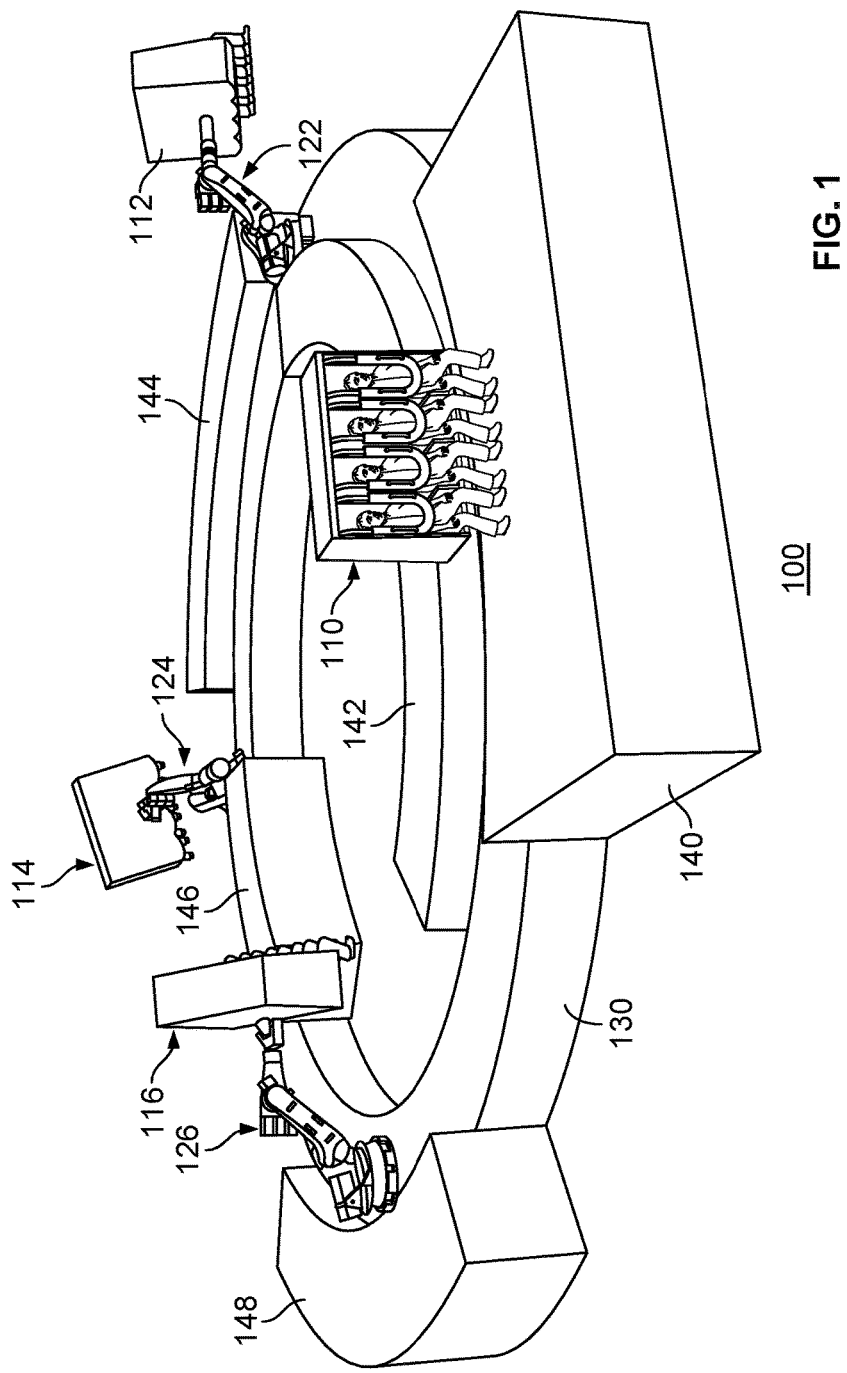
FIG. 1 is a block diagram illustrating an embodiment of a dynamic motion ride system.

FIG. 1 is a block diagram illustrating an embodiment of a dynamic motion ride system 100. In various embodiments, the dynamic motion ride system is referred to as a Turntable-Mounted Dynamic Motion Ride System (TMDMRS) or a Turntable-Mounted Robotic Arm Ride System (TMRARS).

The system 100 includes a plurality of vehicles 110-116, a plurality of motion devices 122-126, a turntable 130, loading/unloading platform 140, and a plurality of egress platforms 142-148.

A vehicle (110-116) accommodates riders of the dynamic motion ride system. A vehicle may include one or more of a capsule, seat, or other structure in which riders are secured in a seated, standing, or other position. Each of the seat structures may have a restraint or other safety harness system. In this example, the safety harness is an over-the-shoulder harness for each individual rider. Each of the vehicles may be fixedly mounted to the turntable 130 via a motion device 120. In this example, each vehicle is sized for four side-by-side seats. Other configurations including multiple rows of seats are possible. Examples of vehicles are shown in FIGS. 10A-10D and described in Table 1.

Figure 9A:
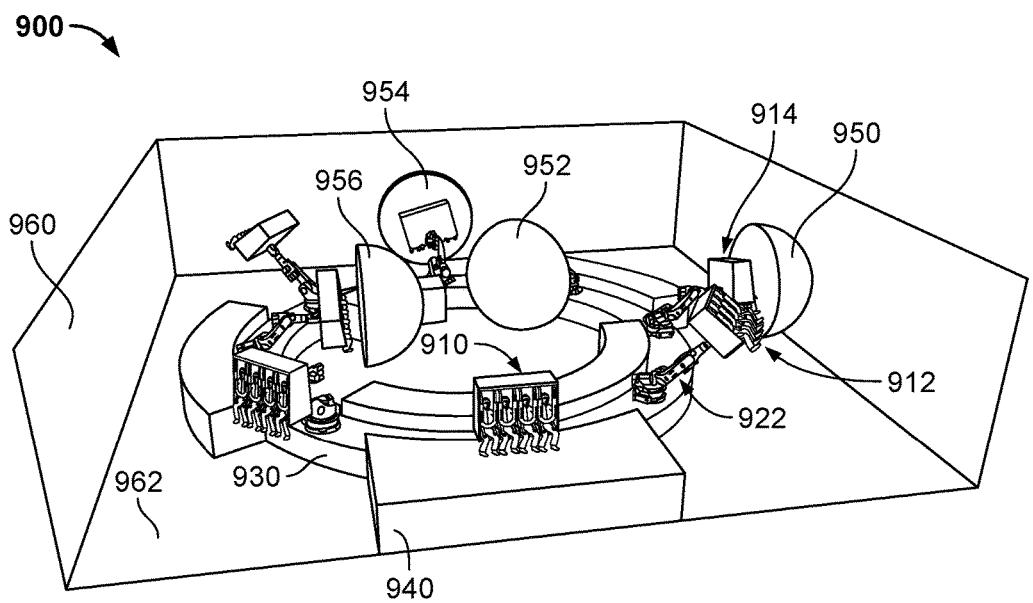
FIG. 9A is a block diagram illustrating an embodiment of a dynamic motion ride system.

A motion device (122-126) manipulates its respective vehicle into different positions. The motion device may be a multi-axis motion device. In various embodiments, the multi-axis motion device is a four-axis robot arm. The motion device may direct the vehicle towards one or more media screens, an example of which is shown in FIG. 9A. Each vehicle may have a respective motion device. In this example, the motion device for vehicle 110 is hidden from view.

A turntable 130 is configured to rotate the motion devices (122-126) through several positions around the turntable. The turntable may be ring-shaped, as shown in FIG. 2, or some other rigid structure or shape (e.g., a disc, a polygon), as shown in FIGS. 3 and 4. In various embodiments, the turntable is coupled to be rotated about an axis that is substantially perpendicular to a plane in which the turntable is oriented.

In some embodiments, the rotation of the turntable 130 may be in one of two modes: constant movement or timed rotations.

Figure 9B:
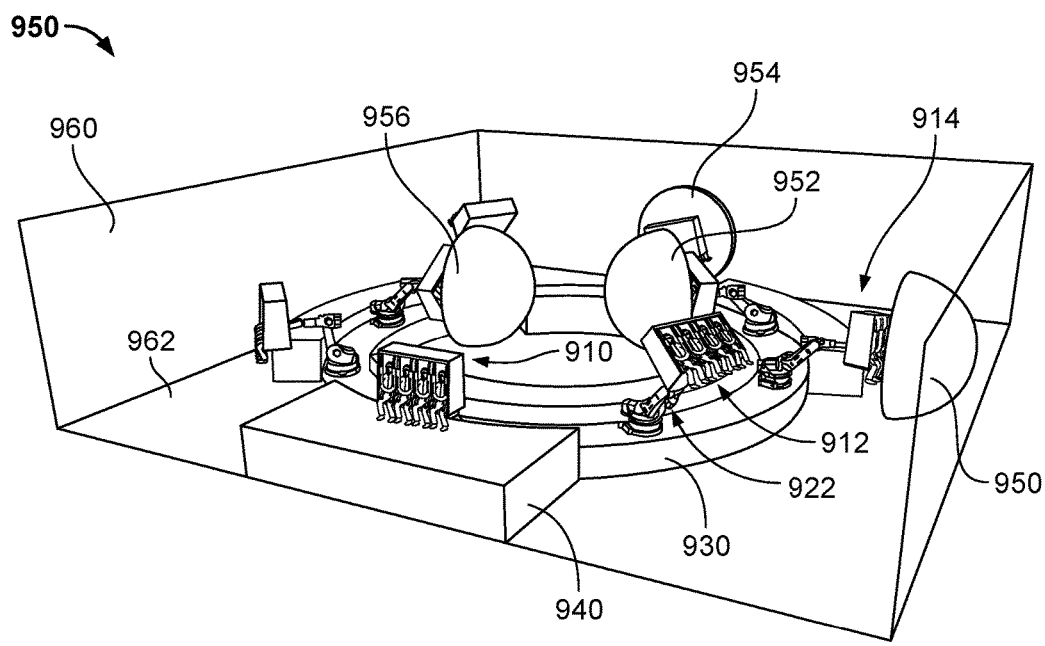
FIG. 9B is a block diagram illustrating an embodiment of a dynamic motion ride system.

In a constant movement model, the turntable is slowly turning at a constant speed, meaning that vehicles slowly move through every scene and are in motion throughout the load and unload process. A matched speed conveyor belt may be used in some embodiments to assist with load and unload of guests from the vehicle. This approach may be suitable where video media screens, such as the fixedly mounted media domes shown in FIGS. 9A and 9B, are not in use.

In a timed rotations model, the turntable rotates at timed intervals, moving each vehicle into the next successive scene and then remaining stationary for the length of a show scene. All vehicles move simultaneously. In some embodiments, all show scene lengths and the time to load and unload a vehicle are about equal. This approach may be suitable where video media screens such as those shown in FIGS. 9A and 9B are used.

A loading/unloading platform 140 allows a rider to board a vehicle 110 at the beginning of a ride and to alight from the vehicle at the end of the ride. For example, at the beginning of a ride, a rider finds his or her seat on the vehicle 110. The safety harness is secured over the shoulders of the rider and the turntable 130 begins rotating. Concurrently with the rotation or after the rotation begins, the motion device may manipulate the vehicle into various positions. During the course of the ride, the turntable 130 rotates vehicle 110 through various positions around the turntable until the ride ends and the turntable 130 returns the vehicle to loading/unloading platform 140.

In this example, each ride vehicle (110-116) is mounted on a respective motion device (122-126). The motion device (122-126) is fixedly mounted on the turntable 130. The motion device may be used to move the riders, simulating the motion of rollercoasters or other traditional amusement park rides and natural experiences such as earthquakes, flights, etc. In various embodiments, as the turntable rotates, the motion device may be used to point the riders at display screens or other visual and/or multi-media attractions, as further described with respect to FIGS. 9A and 9B.

An egress platform (142-148) allows a rider to safely evacuate a vehicle, e.g., in the case of emergencies. Egress platforms may be located along the inside or outside of the turntable 130. In this example, there are four egress platforms 142, 144, 146, and 148, where platforms 142 and 146 are located along the inside of the turntable 130 and platforms 144 and 148 are located on the outside of the turntable 130. The egress platforms may be located on the opposite side from the media or scenic display in each scene as shown in FIGS. 9A and 9B. In various embodiments, the egress platforms are configured to be stationary or moving. A combination of fixed and moving egress platforms are provided to ensure guests can safely evacuate the attraction in the case of emergencies. In various embodiments, during an evacuation, the turntable 130 stops and the vehicles 110-116 are rotated to the egress platforms 142-148 to allow guests to safely exit the vehicles. The ultimate configuration and placements of the platforms may be determined based on the specific scenic and media positions in each attraction embodiment.

Figure 12:
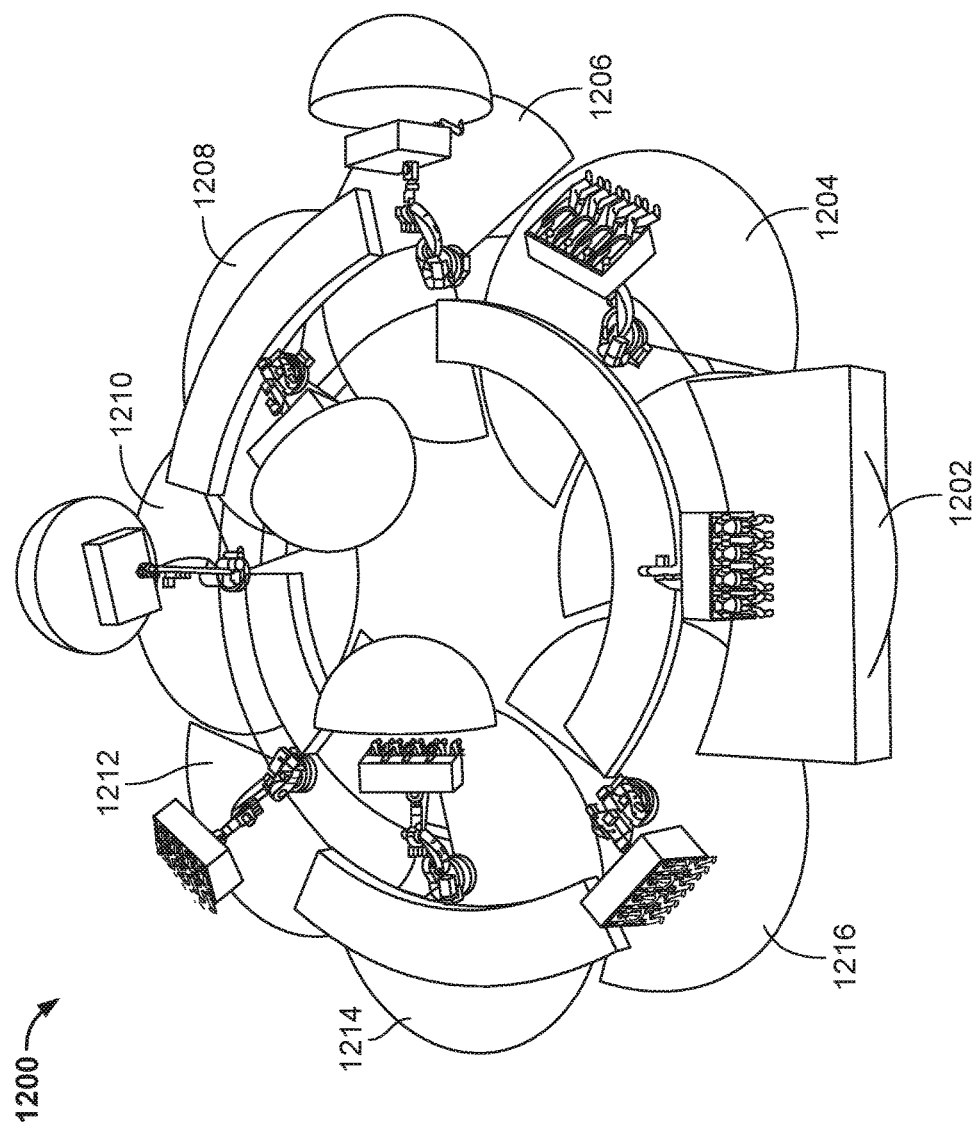
FIG. 12 is a block diagram illustrating an embodiment of a dynamic motion ride system showing range of motion envelopes.
Figure 13:
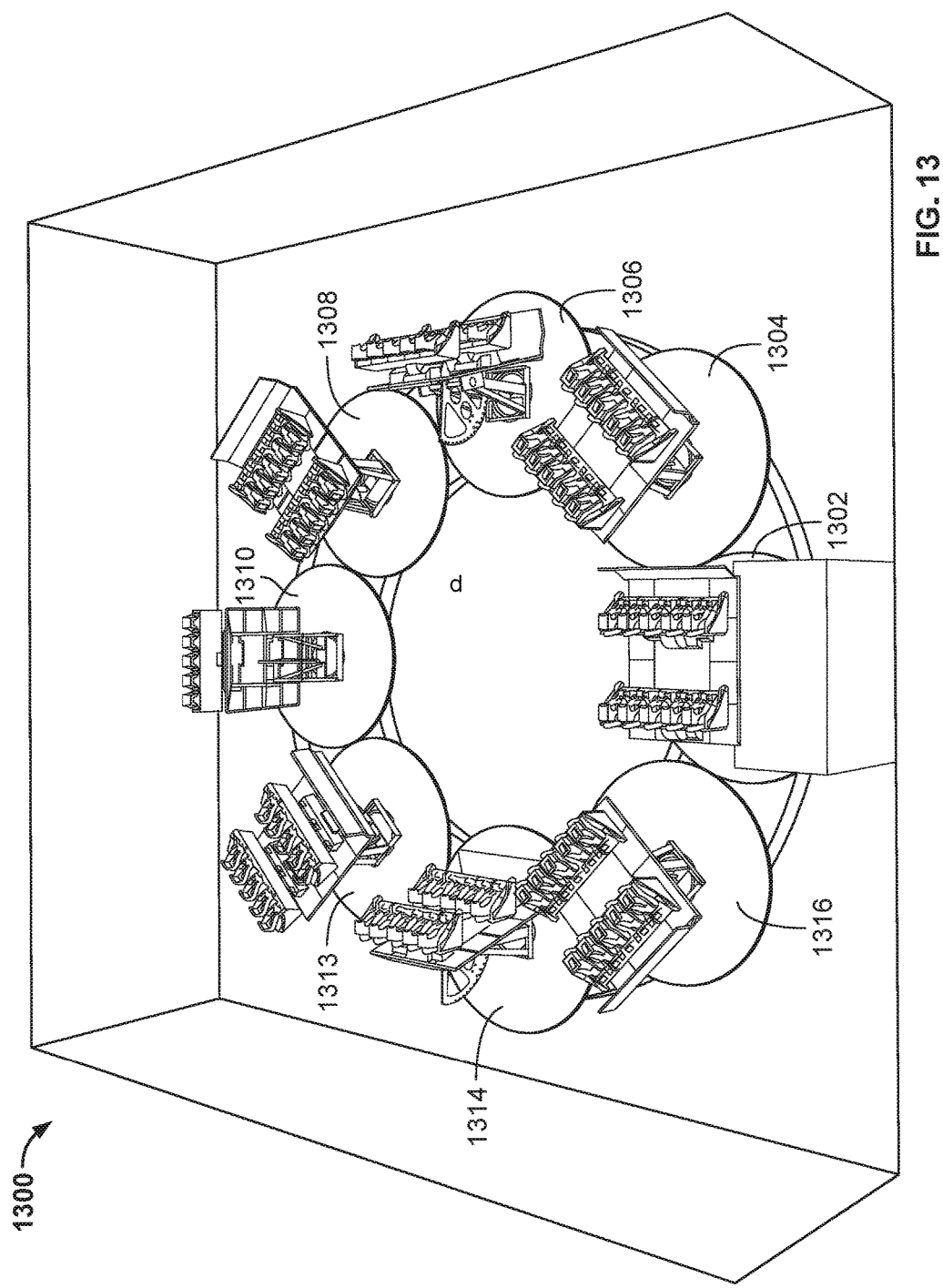
FIG. 13 is a block diagram illustrating an embodiment of a dynamic motion ride system showing range of motion envelopes.

In the example shown in FIG. 1, the system includes four vehicles. The amount of vehicles on the turntable can be one or more, although two or more may be used in various embodiments. FIGS. 9A and 9B show examples of a system with 8 vehicles. Additional vehicles may increase the diameter of the turntable. In some embodiments, vehicles are mounted with the 0 degrees of their axis 1 (i.e., rotation about vertical axis of mount to turntable) facing in the direction of the turntable's forward motion (i.e., along a tangent of turntable), allowing the vehicle to rotate cabins to either the inside or outside of the turntable path. Example vehicle spacing based on reach envelopes are shown in FIGS. 12 and 13.

FIG. 2 is a block diagram illustrating an embodiment of a turntable for a dynamic motion ride system. In the example shown in FIG. 2, the turntable is ring-shaped. FIG. 3 is a block diagram illustrating an embodiment of a turntable for a dynamic motion ride system. In the example shown in FIG. 3, the turntable is a rigid structure including three segments 306.1-306.3. FIG. 4 is a block diagram illustrating an embodiment of a turntable for a dynamic motion ride system. In the example shown in FIG. 4, the turntable is a rigid structure or shape (triangular). Other polygons are also possible.

The turntables shown in each of FIGS. 2-4 may be coupled to be rotated about a respective axis 204, 304, 404 that is substantially perpendicular to a plane in which the turntable is oriented, e.g., the axis is coming out of the page. One or more motion devices (202.1-202.3, 302.1-302.3, 402.1-402.3) may be provided on the turntable. An example of a motion device is motion device 122 of FIG. 1. The turntables shown in FIGS. 2-4 are suitable for a dynamic motion ride system such as those shown in FIGS. 1, 9A, 9B, and 11.

Figure 5A:
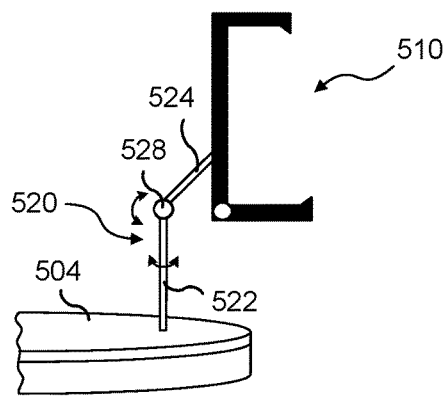
FIG. 5A is a block diagram illustrating an embodiment of a motion device for a dynamic motion ride system.
Figure 5B:
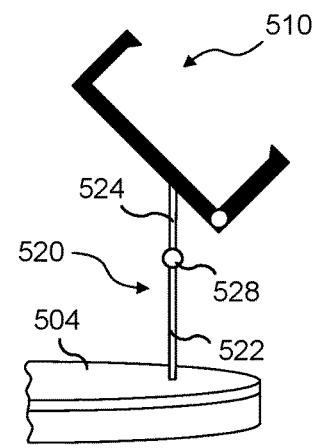
FIG. 5B is a block diagram illustrating an embodiment of a motion device for a dynamic motion ride system.

FIG. 5A is a block diagram illustrating an embodiment of a motion device 520 for a dynamic motion ride system. In FIG. 5A, motion device 520 is shown in a first state. FIG. 5B is a block diagram illustrating an embodiment of a motion device for a dynamic motion ride system. In FIG. 5B, motion device 520 is shown in a second state.

Referring to FIGS. 5A and 5B, the motion device 520 may be fixedly mounted to turntable 504 and coupled to vehicle 510. In this example, the motion device includes two segments 522, 524 movably connected to each other via joint 528. Segment 522 couples the motion device to turntable 504 and segment 524 couples the motion device to vehicle 510. In this example, the motion device rotates about two axes of rotation through joint 528.

In the state shown in FIG. 5A, segment 524 is angled such that the vehicle 510 is substantially perpendicular to the turntable 504. In the state shown in FIG. 5B, the motion device has rotated about a pitch axis at joint 528 and the segment 524 correspondingly angles such that the vehicle 510 is oriented as shown.

In various embodiments, the motion device may include additional joints or axes of rotation. In various embodiments, the motion device may have multi-axis rotation including yaw, pitch, and roll.

Figure 5C:
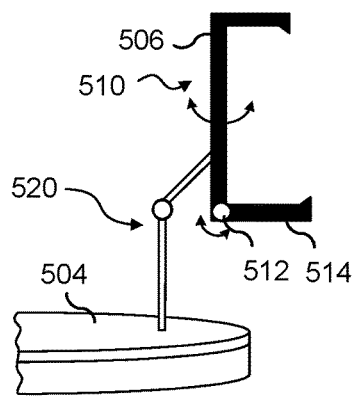
FIG. 5C is a block diagram illustrating an embodiment of a vehicle for a dynamic motion ride system.
Figure 5D:
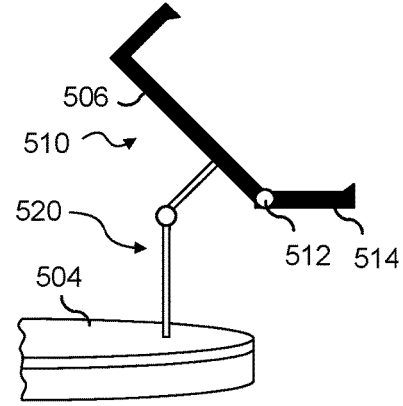
FIG. 5D is a block diagram illustrating an embodiment of a vehicle for a dynamic motion ride system.

FIG. 5C is a block diagram illustrating an embodiment of a vehicle 510 for a dynamic motion ride system. In FIG. 5C, vehicle 510 is shown in a first state. FIG. 5D is a block diagram illustrating an embodiment of a vehicle for a dynamic motion ride system. In FIG. 5D, vehicle 510 is shown in a second state.

Referring to FIGS. 5C and 5D, the vehicle 510 may be movably connected to motion device 520 and motion device may be fixedly mounted to turntable 504

In this example, the vehicle includes a seatback 506 and a seat bottom 514. The seatback and the seat bottom are movably connected to each other via rotatable joint 512. Rotation about joint 512 changes the angle formed by the seatback and the seat bottom.

In the state shown in FIG. 5C, seatback 506 is angled such that the seatback and the seat bottom form a substantially right angle. In the state shown in FIG. 5D, the seatback has rotated about joint 512 such that the seatback and the seat bottom form an obtuse angle.

Figure 6:
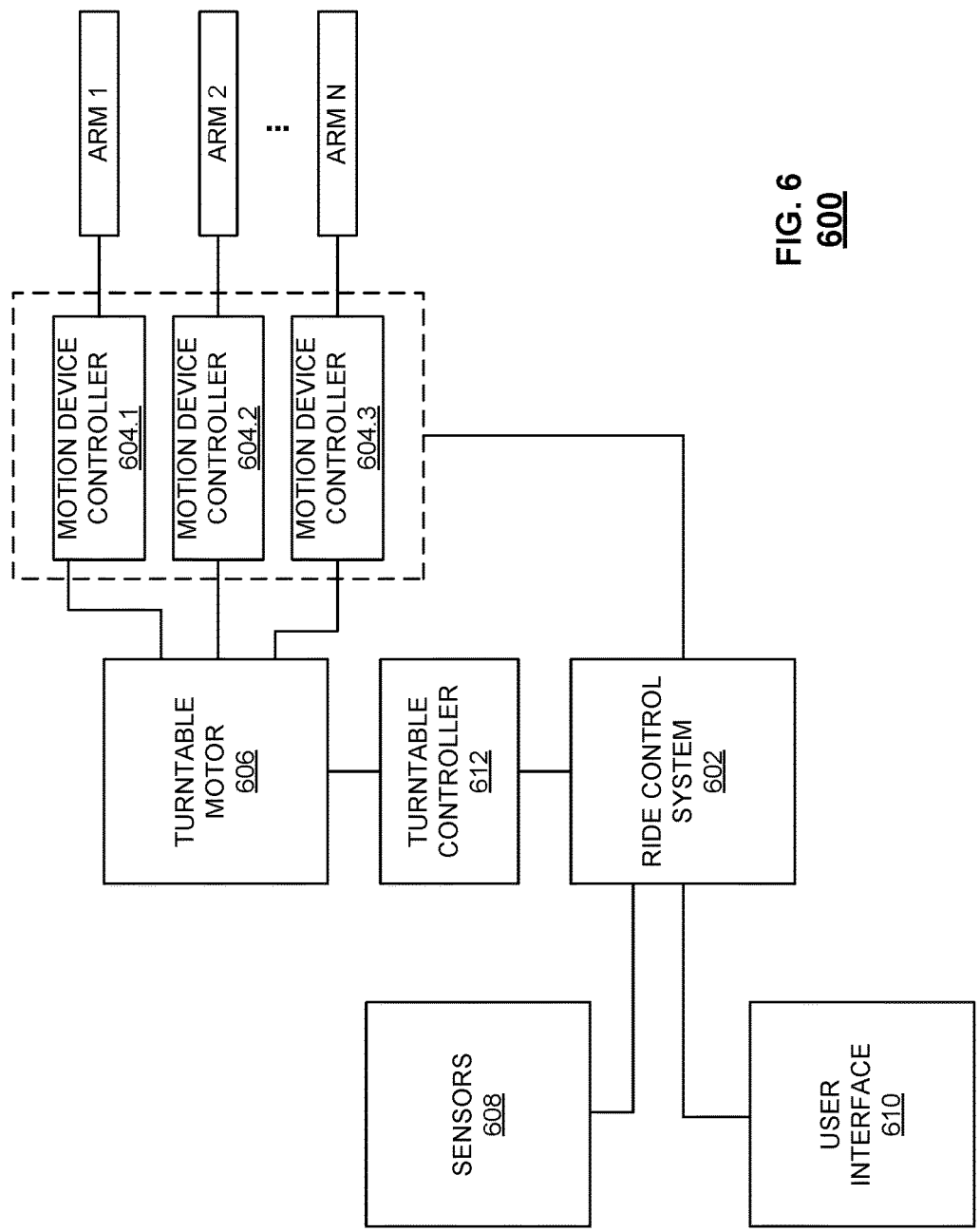
FIG. 6 is a block diagram illustrating an embodiment of a control system for a dynamic motion ride system.

FIG. 6 is a block diagram illustrating an embodiment of a control system 600 for a dynamic motion ride system. For example, the control system 600 may be for dynamic motion ride system 100 of FIG. 1. The control system includes a ride control system 602, one or more motion device controllers 604.1-604.3, a turntable motor 606, a turntable controller 612, one or more sensors 608, and a user interface 610.

The ride control system 602 coordinates operation of components of a dynamic motion ride system. For example, the ride control system may operate the ride system according to a ride sequence. The ride sequence may be defined by one or more movements of a turntable or a motion device synchronized, in some cases, with multimedia. The ride control system may use the turntable motor to move vehicles through several positions during the course of a ride and may use the motion device controller to manipulate the motion device through various orientations/positions during the course of the ride. The ride control system may determine operation of the ride system based on one or more sensor readings reported by sensor(s) 608. In various embodiments, the ride control system is configured to execute process 800 of FIG. 8.

In case of emergency, the ride control system may use the turntable motor and the motion device controller to bring the vehicles to a safe location, e.g., to egress platforms to allow riders to disembark the vehicles. An example of the ride control system is system 700 of FIG. 7. An example of a ride sequence is described with respect to FIGS. 14A-14C.

The motion device controller(s) 604.1-604.3 actuates one or more motion devices (Arm 1, Arm 2, . . . Arm N) such as motion devices 122-126 of FIG. 1. In various embodiments, each of the motion devices (Arm 1, Arm 2, . . . Arm N) has a respective motion device controller 604.1-604.3. In various embodiments, a single motion device controller (not shown) may be configured to actuate each of the motion devices. Motion device controllers may be communicatively coupled to each other and/or instructed by the ride control system 602 to control movement. In various embodiments, there may be a physical limit in the range of motion of the motion device controllers such that the respective vehicles of the motion device controllers do not bump into one another. For example, the range of motion of each motion device is defined by an envelope, and the envelopes fit or overlap in a manner such that vehicles do not make physical contact with each other as further described herein with respect to FIGS. 12 and 13.

The turntable motor 606 is configured to actuate a turntable such as turntable 130 of FIG. 1. The turntable motor 606 may rotate the turntable about an axis substantially perpendicular to a plane in which the turntable is oriented. The ride control system 602 may instruct the turntable motor to move constantly or in a timed manner as described herein with respect to FIG. 1.

The turntable controller 612 provides instructions to the turntable motor 606. The turntable controller may be communicatively coupled the ride control system 602, allowing the ride control system to control movement of the turntable motor.

The sensor(s) 608 is configured to determine a state of various components of a dynamic motion ride system such as system 100 of FIG. 1. The sensors may determine a location of a motion device with respect to the turntable, platform, media dome, or other structure of the dynamic motion ride system. The sensors may determine safety aspects of the dynamic motion ride system such as whether a safety harness is properly in place. The sensors may determine characteristics of a rider such as height, weight, etc. The characteristics of the rider may affect the placement of the vehicle relative to a ride component. For example, a vehicle position may be adjusted to accommodate a relatively short rider such that the rider views media as intended, e.g., the experience is comparable as for a relatively tall rider. The sensors may include a laser, infrared, radar, gyroscope, accelerometer, etc.

The user interface 610 may receive input and provide output to a user of the ride control system. An example of the user interface is user interface 704 of FIG. 7.

Figure 7:
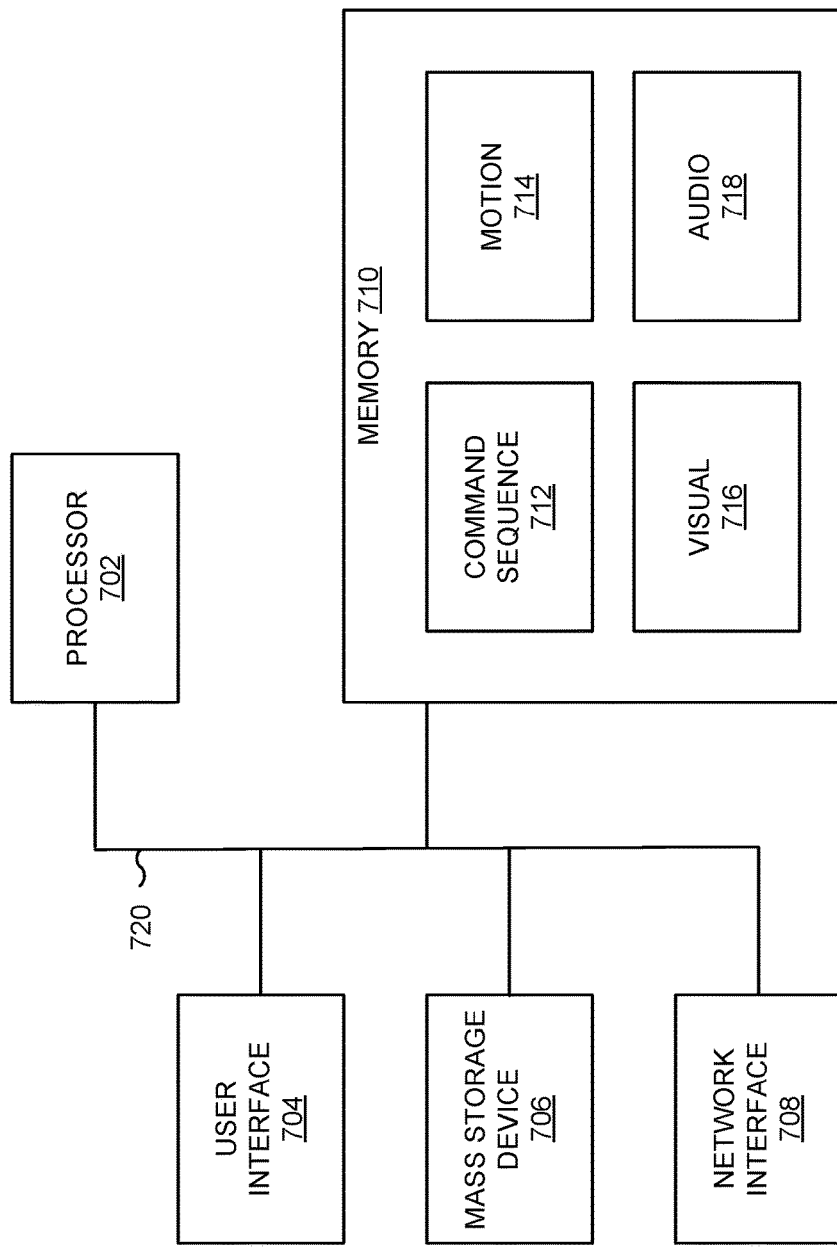
FIG. 7 is a functional diagram illustrating a programmed computer system for a dynamic motion ride control system in accordance with some embodiments.

FIG. 7 is a functional diagram illustrating a programmed computer system 700 for a dynamic motion ride control system in accordance with some embodiments. For example, the system 700 may be for control system 600 of FIG. 6. As will be apparent, other computer system architectures and configurations can be used to control a dynamic motion ride system. Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory, the processor 702 controls the reception and manipulation of input data, and the output and display of data on output devices (e.g., user interface 704). In some embodiments, processor 702 includes and/or is used to execute/perform the processes described below with respect to FIGS. 8.

Processor 702 is coupled bi-directionally with memory 710. In this example, memory 710 includes command sequence data 712, motion data 714, visual data 716, and audio data 718. Command sequence data 712 includes information about system components and target locations (e.g., defined with respect to a turntable and/or position of a vehicle) during a ride. Command sequence data 712 may also include pointers to media (e.g., audio, visual, and other sensory stimuli) to be displayed to a vehicle at a particular target location. The media may be separately stored (716, 718). The motion data 714 may include positions or sequences of motion for a vehicle at various locations about a turntable. For example, when a vehicle reaches a first position on the turntable, the vehicle may be manipulated through a series of turns, rolls, etc. The sequence of movement of the vehicle may be stored (714) separately from basic command sequence data (712). In various embodiments, several different sequence of movements of the vehicle may be associated with each target location. This may provide novelty to a rider because the dynamic motion ride system may combine numerous different segments of ride sequences to assemble a complete ride sequence. The visual media 716 stored in memory may include still and/or motion images. For example, short animations or live action clips may be stored. The audio media 716 may include music, speech, and other sound effects. The audio media may be synchronized with visual media 716 when presented to a rider. Contents of memory 710 may be updated, modified, or retrieved via user interface 704 and/or network interface 708. An example of a command sequence with synchronized media is described herein with respect to FIGS. 14A-14C.

Memory 710 can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown).

A removable mass storage device 706 provides additional data storage capacity for the computer system 700, and is coupled either bi-directionally (read/write) or uni-directionally (read only) to processor 702. For example, storage 706 can also include computer-readable media such as magnetic tape, flash memory, PC-CARDS, portable mass storage devices, holographic storage devices, and other storage devices. A fixed mass storage (not shown) can also, for example, provide additional data storage capacity. The most common example of mass storage is a hard disk drive. Mass storage generally store additional programming instructions, data, and the like that typically are not in active use by the processor 702. It will be appreciated that the information retained within mass storage can be incorporated, if needed, in standard fashion as part of memory 710 (e.g., RAM) as virtual memory.

In addition to providing processor 702 access to storage subsystems, bus 720 can also be used to provide access to other subsystems and devices. As shown, these can include a user interface 704, a network interface 708, as well as sound card, speakers, and other subsystems as needed. For example, the user interface 704 can be a mouse, stylus, track ball, or tablet, and is useful for interacting with a graphical user interface.

The network interface 708 allows processor 702 to be coupled to another computer, computer network, or telecommunications network using a network connection as shown. For example, through the network interface 708, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 708.

A user interface 704 can be used in conjunction with computer system 700. The user interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 7 is but an example of a computer system suitable for use with the various embodiments disclosed herein. Other computer systems suitable for such use can include additional or fewer subsystems. In addition, bus 720 is illustrative of any interconnection scheme serving to link the subsystems. Other computer architectures having different configurations of subsystems can also be utilized.

Figure 8:
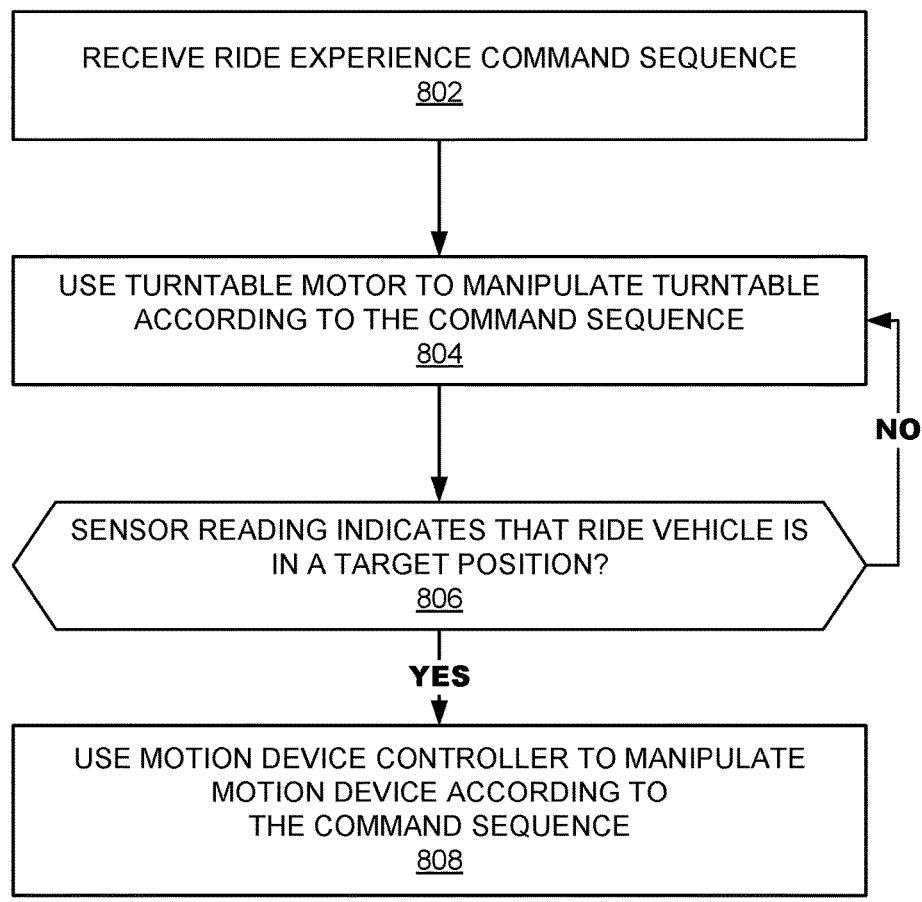
FIG. 8 is a flow chart illustrating an embodiment of a process for a dynamic motion ride system.

FIG. 8 is a flow chart illustrating an embodiment of a process 800 for a dynamic motion ride system. Process 800 may be executed by a ride control system such as ride control system 602 of FIG. 6

At 802, a ride experience command sequence is received. The command sequence may include synchronized media, turntable actuation, and motion device actuation. For example, for a ride duration, each time marker has a corresponding vehicle position (e.g., on a turntable and in xyz-space) and media, if any, to be displayed at that time.

At 804, a turntable motor is used to manipulate a turntable according to the command sequence. For example, a degree/amount of movement may be determined from the command sequence and translated to an instruction understandable by the turntable motor.

At 806, a sensor reading indicates whether the ride vehicle is in a target position. For example, a laser sensor determines whether a vehicle is in a target position on the turntable or in space (e.g., height above a turntable).

If the ride vehicle is in a target position, the motion device controller is used to manipulate the motion device according to the command sequence (808). Otherwise, if the ride vehicle is not in a target position, the process returns to 804 in which the turntable motor is used to manipulate the turntable according to the command sequence. For example, the turntable motor may be used to turn the vehicle a bit more towards the target position.

FIG. 9A is a block diagram illustrating an embodiment of a dynamic motion ride system 900. FIG. 9A shows a first view of the system. FIG. 9B is a block diagram illustrating an embodiment of a dynamic motion ride system 950. FIG. 9A shows a second view of the system in which the viewer is situated in the bottom right corner of the room and the system is rotated to the left relative to the first view.

Referring to FIGS. 9A and 9B, the system includes eight vehicles. Each of the vehicles is fixedly mounted to the turntable 930. Each of the vehicles may be evenly spaced around the turntable. As the turntable turns, vehicles may be moved from target location to target location. By rotating 360 degrees around the turntable, riders of the vehicle experience a ride sequence. In various embodiments, as the turntable 930 rotates, each vehicle is simultaneously moved into a next successive show scene or other attraction, display, and/or experience.

In this example, a first vehicle 910 is being loaded/unloaded on platform 940. A second vehicle 912 has been moved to an elevated position via motion device 922. A third vehicle 914 is manipulated in front of media dome 950. As shown in FIG. 9B, riders of vehicle 914 are positioned in close proximity to or inside the media dome 950. The media dome may have a concave surface to provide an immersive experience to the riders. In various embodiments, the display screen may be curved around the vehicle.

Media may be displayed on media dome 150, and other surfaces in the surroundings of the ride system such as wall 960 and floor 962. The media displayed in each of the domes or on the surfaces may be synchronized. The media may be played on conventional displays such as LCD monitors, LED monitors, and the like. The media may be projected onto a medium.

For simplicity, other components of the system are not described. In various embodiments, systems 900 and 950 include components like those described with respect to system 100 of FIG. 1.

The dynamic motion ride system may have various numbers of seats. For example, seating configurations of the ride vehicle may be modular to accommodate 4, 6, 10, or other number of passengers. FIGS. 10A-10D show example seat configurations. FIG. 10A is a block diagram illustrating an embodiment of vehicle 1000 for a dynamic motion ride system. Vehicle 1000 includes two rows of seats, each row having 5 seats. FIG. 10B is a block diagram illustrating an embodiment of vehicle 1030 for a dynamic motion ride system. Vehicle 1030 includes two rows of seats, each row having 3 seats. FIG. 10C is a block diagram illustrating an embodiment of vehicle 1050 for a dynamic motion ride system. Vehicle 1050 includes a single row of four seats. FIG. 10D is a block diagram illustrating an embodiment of vehicle 1070 for a dynamic motion ride system.

Referring to FIGS. 10A-10D, each ride vehicle comprises one or more rows of seats capable of being rotated about a vertical axis (perpendicular to the ground). In various embodiments, each ride vehicle is capable of being manipulated through a range of positions about an axis parallel to the ground and/or the respective rows of seats, and, in some embodiments, parallel to a tangent of the turntable. In FIGS. 10A-10C, the seats are mounted on a respective vehicle seating platform 1024, 1034, and 1054. The seating platforms may be dimensioned with the labeled widths (W1, W3) and lengths (L1, L2, and L3). In an example embodiment, W1=9108 mm, W3=4503 mm, L1=7231 mm, L2=4352 mm, and L3=5764 mm.

In various embodiments, the ride vehicles shown in each of FIGS. 10A-10C is configured to tilt, angle, and twist, but not move from side-to-side.

The vehicle type shown in FIG. 10D is also shown in dynamic motion ride system 100 of FIG. 1. The vehicle 1070 may be dimensioned with the labeled length L4 and width W4. In an example embodiment, W4=6936 mm and L4=5485 mm. A ride system may include a single type of vehicle or a mixture of vehicle types. The rows of seats may be mounted on a respective motion device 1022, 1032, 1052, 1072. An example of a motion device is 122 of FIG. 1.

In some embodiments, each ride vehicle and/or associated elements are configured according to values shown in Table 1 below. The values provided are exemplary typical values and other values are also possible.

TABLE 1

| Parameter | Value |
|---|---|
| Number of Seats per Vehicle | 4, 6 or 10 |
| Seat Configuration (Front to Back) | 1 row of 4 riders, 2 rows of 3 riders, or 2 rows of 5 riders |
| Restraint System | Individual over the shoulder |
| Recommended Minimum Ride Height | ≥around 120 cm |
| Exemplary Hourly Capacity | 206 to 900 riders |
| Dispatch Time | 60 sec/70 sec (Single load) or 40 sec (Separate load/unload) |
| Ingress/Egress Time | 50 sec/60 sec (Single load) or 30 sec (Separate load/unload) |
| Show Time | 3.5 min to 6 min |
| Total Ride Time | 4 min to 7 min |
| Seating Platform Pitch (Fore) | +88° @ 6 sec |
| Individual Seat Pitch (Aft) | −105° @ 6 sec |
| Rotary Axis Speed (Yaw) | 60°/sec |
| Turntable Speed | 4.5°/sec (8 vehicles) or |

TABLE 1-continued

| Parameter | Value |
| --- | --- |
| | 6°/sec (6 vehicles) |
| Vehicle Length | ≤around 4.8 meters |
| Vehicle Width | ≤around 4.2 meters |
| Vehicle Height | ≤around 5.6 meters |

Figure 11:
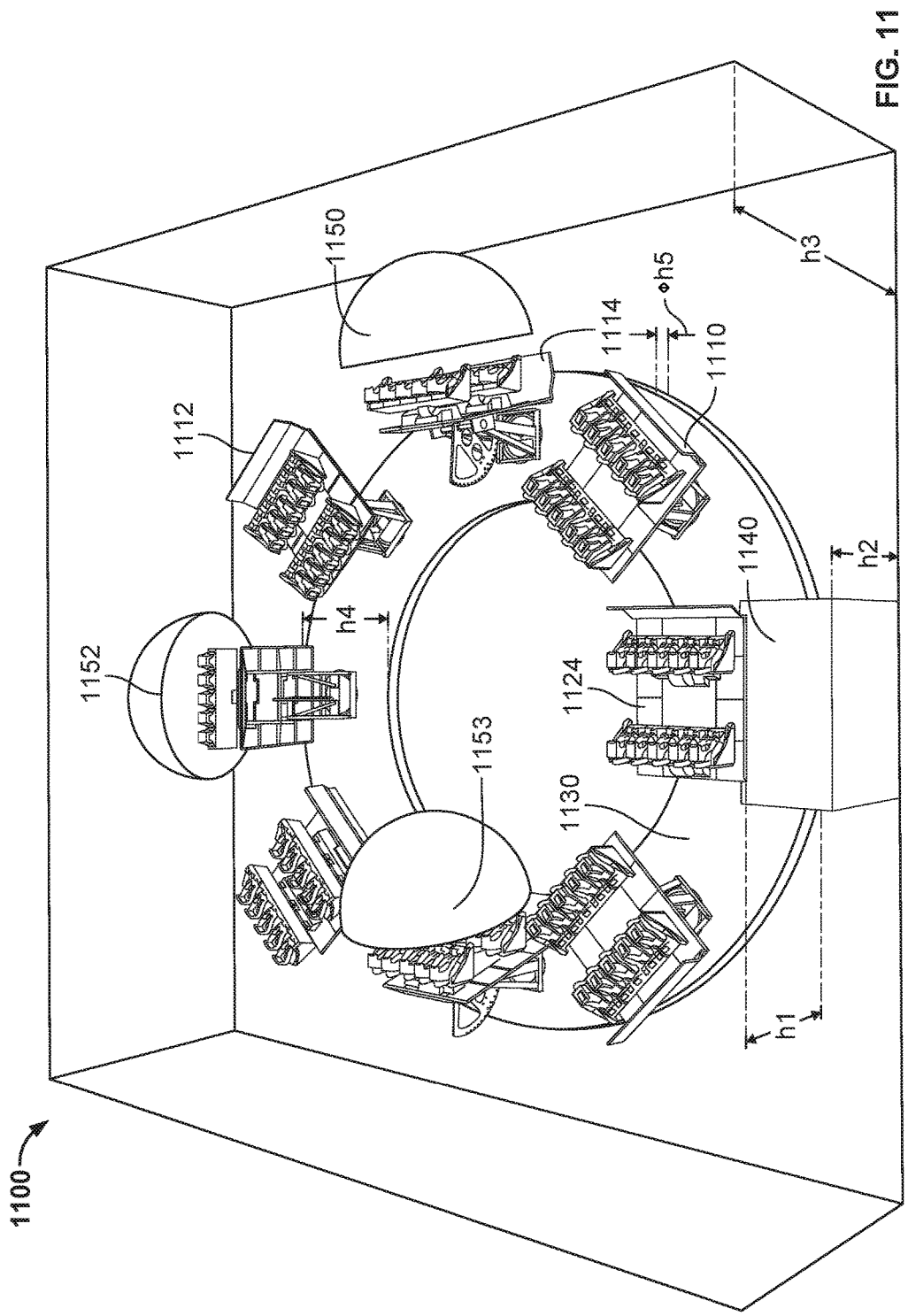
FIG. 11 is a block diagram illustrating an embodiment of a dynamic motion ride system.

FIG. 11 is a block diagram illustrating an embodiment of a dynamic motion ride system 1100. The system 100 includes a plurality of vehicles (1110, 1112, among other unlabeled vehicles), a plurality of motion devices, a turntable 1130, and a loading/unloading platform 1140.

For simplicity, the components of system 1100 that are like the ones in system 100 are not labelled. Unless otherwise described herein, the components of system 1100 have the same functions as their counterparts in FIG. 1.

A vehicle (e.g., 1110) accommodates riders of the dynamic motion ride system. A vehicle may include one or more of a capsule, seat, or other structure in which riders are secured in a seated, standing, or other position. Each of the seat structures may have a restraint or other safety harness system. In this example, each vehicle is sized for the seats shown in FIG. 10A. Each of the vehicles may be fixedly mounted to the turntable 1130 via a motion device.

In various embodiments, in operation, in the load/unload area 1140, the vehicle seating platform 1124 in various embodiments is in a horizontal orientation. In various embodiments, once riders are seated, each rider is secured with a comfortable over the shoulder restraint. When the vehicle moves forward, the seating platform 1124 rotates to a substantially vertical orientation such that the two rows are situated one above the other and riders face substantially forward. For example, vehicle 1114, which has been rotated relative to a loading state and is in a substantially vertical orientation.

In the "show" position (e.g., when media dome media is displayed to riders), the platform is capable of a thrilling forward pitch up to a full predetermined angle (e.g., 88 degrees). Combining this with the seats' ability to then pitch back to a predetermined angle (e.g., 105 degrees), a total available range (e.g., 193 degrees) allows for a totally novel sensation, also giving the effect of heave. The seating platform is additionally able to rotate 360 degrees about its vertical axis. When the attraction comes to an end back at the load/unload area 1140, the theatre seating platform 1124 may return to the horizontal load/unload position where the restraints are released and riders may exit.

In various embodiments, the system 1100 includes a plurality of media domes 1150. An example of a media dome is media dome 950 of FIG. 9.

The system 1100 may be proportioned as shown. For example, loading/unloading platform 1140 has a height of h2. A distance between a vehicle and the bottom of the platform 1140 is h1. A distance between a vehicle and the top of the platform is h4. The thickness of the platform is h5. The height of a wall is h3. In an example embodiment, the loading platform has an inner diameter of 7.7634 m and an outer diameter of 16.9621 m.

FIG. 12 is a block diagram illustrating an embodiment of a dynamic motion ride system 1200 showing range of motion envelopes. System 1200 shows range of motion envelopes for systems 900 and 950 of FIGS. 9A and 9B. FIG. 13 is a block diagram illustrating an embodiment of a dynamic motion ride system 1300 showing range of motion envelopes. System 1300 shows range of motion envelopes for system 1100 of FIG. 11. Unless otherwise described herein, systems 1200 and 1300 each has the same components as the system shown in FIG. 9A.

In this example, the range of motion of each motion device may be defined by a circular envelope, and the envelopes fit or overlap in a manner such that vehicles do not make physical contact with each other. Here, vehicles may be mounted with the 0 degrees of their axis 1 (i.e., rotation about vertical axis of mount to turntable) facing in the direction of the turntable's forward motion (i.e., along tangent of turntable), allowing the vehicle to rotate cabins to either the inside or outside of the turntable path. The vehicles may be spaced as shown such that their range of motion relative to each other are as shown.

In various embodiments, the range of motion envelopes may be implemented by a physical limit in the range of motion of the motion device controllers such that the respective vehicle of the motion device controllers do not bump into one another. In various embodiments, the range of motion envelopes may be implemented by a control system that will prevent a vehicle from being manipulated into the path of another vehicle.

Figure 14A:
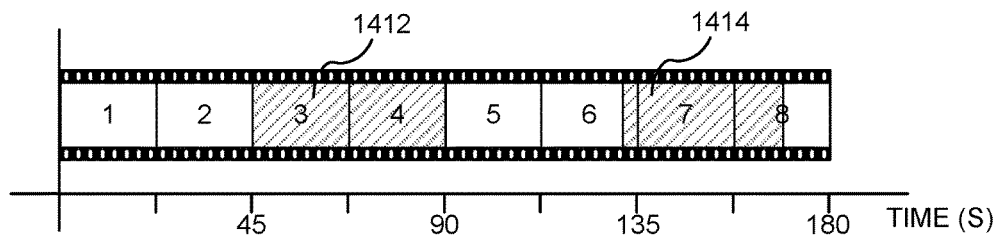
FIG. 14A is a block diagram illustrating an embodiment of media played during a ride sequence for a dynamic motion ride system.
Figure 14B:
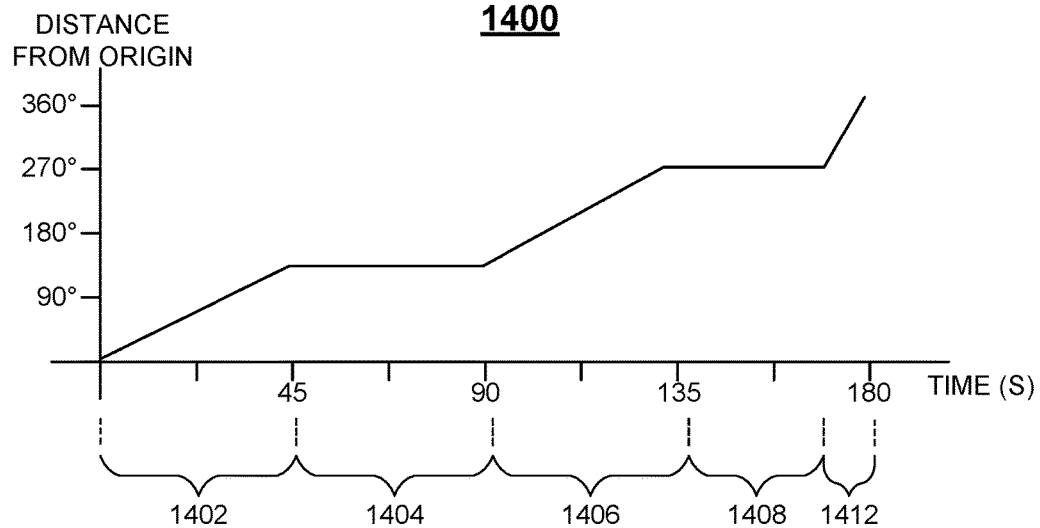
FIG. 14B is a block diagram illustrating an embodiment of positions of a vehicle with respect to a turntable during a ride sequence for a dynamic motion ride system.
Figure 14C:
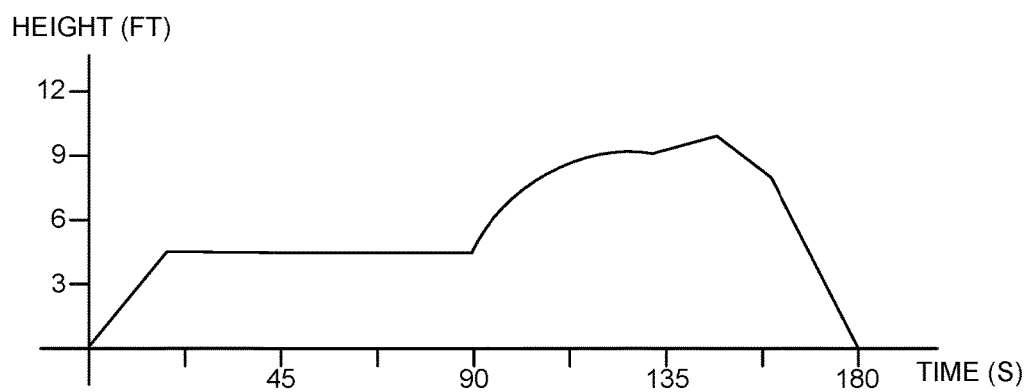
FIG. 14C is a block diagram illustrating an embodiment of positions of a motion device during a ride sequence for a dynamic motion ride system.

FIG. 14A is a block diagram illustrating an embodiment of media played during a ride sequence for a dynamic motion ride system. FIG. 14B is a block diagram illustrating an embodiment of positions of a vehicle with respect to a turntable during a ride sequence for a dynamic motion ride system. FIG. 14C is a block diagram illustrating an embodiment of positions of a motion device during a ride sequence for a dynamic motion ride system. In this example, the media 1400, vehicle positions with respect to a turntable 1430, and motion device positions 1450 are synchronized. The ride sequence is 180 seconds long. As shown, the media includes a number of scenes (8 scenes here, for simplicity). Each scene is approximately 22.5 seconds long. The scenes may be still and/or animated. In various embodiments, the scene is played on several surfaces, e.g., walls and a floor of a room in which the ride system is provided. A portion of the scenes may be played inside a media dome. In this example, the shaded portions 1412, 1414 are played in a media dome.

At time 0, riders have completed boarding a vehicle and the ride sequence begins. The first two scenes are played in the first 45 seconds (FIG. 14A). During this time, the vehicle linearly rotates to around 95 degrees relative to a starting point (FIG. 14B). The motion device reaches a height of around 4.5 feet and remains at that height until 90 seconds after the ride began (FIG. 14C). The vehicle is positioned in front of a media dome and between 45 seconds and 90 seconds, scenes 3 and 4 are played inside a media dome. The vehicle then rotates on the turntable to 270 degrees from the origin. During this time scenes 5 and 6 are played. During this time, the motion device moves the vehicle as shown, reaching a height of around 9 feet. The vehicle may be positioned in front of a media dome and between 135 seconds and around 169 seconds, a portion of scene 6, scene 7, and a portion of scene 8 are played inside a media dome. The vehicle may be moved while it is inside a media dome. For example, the motion device moves the vehicle as shown in FIG. 14C while the vehicle is inside the media dome. Finally, the vehicle returns to its starting position (360 degrees), is lowered to its starting height (0 feet), and the riders may disembark the vehicle. Although this example shows variation in timing between scenes, in other embodiments, timing between scenes (e.g., media screen stations) are uniform and there is no variation in timing between scenes.

The dynamic motion ride system described here is a unique attraction with a small footprint, where riders experience the dynamic movements of a motion vehicle while moving through physical sets and immersive video media screens. Unlike existing motion device amusement park ride systems, in various embodiments dynamic motion ride vehicles move from show scene to show scene without the need for a track or individual systems of propulsion. The motion devices allow increased capacity compared with conventional ride systems. In various embodiments, a modular dynamic motion ride system described here may also be easily expanded or reduced in size.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A ride system comprising:
   a turntable;
   a plurality of multi-axis motion devices mounted in a fixed position on the turntable;
   a plurality of media domes configured to display media; and
   a control system configured to manipulate the turntable and the plurality of multi-axis motion devices in synchronization with media provided in an environment of the ride system including by defining a sequence of movements to rotate a first multi-axis motion device to a first one of the plurality of media domes and, subsequently, to rotate a second multi-axis motion device to the first one of the plurality of media domes.

2. The system of claim 1, wherein the control system is configured to manipulate the ride system in a sequence of movements as at least one of the multi-axis motion devices is rotated to different positions from a starting position.

3. The system of claim 1, wherein at least one of the multi-axis motion devices is configured to rotate about four axes.

4. The system of claim 1, wherein the media includes an immersive video media screen, wherein at least one of the multi-axis motion devices is rotated with respect to the immersive video media screen.

5. The system of claim 4, wherein at least one of the multi-axis motion devices remains stationary before the immersive video media screen for a pre-defined length of time.

6. The system of claim 1, wherein at least one of the multi-axis motion devices includes at least one seat, wherein the at least one seat is configured to pitch, roll, and yaw.

7. A ride control system comprising:
   a processor configured to:
     use a turntable motor controller to manipulate a turntable to execute a ride experience command sequence;
     display media on a plurality of media domes; and
     use a motion device controller to manipulate a plurality of multi-axis motion devices to execute the ride experience command sequence, wherein the ride experience command sequence includes manipulating a first multi-axis motion device in synchronization with media and the command sequence includes rotating the first multi-axis motion device to a first one of the plurality of media domes and, subsequently, rotating a second multi-axis motion device to the first one of the plurality of media domes; and
   a memory coupled to the processor and configured to store the ride experience command sequence.

8. The ride control system of claim 7, wherein the turntable is circular.

9. The system of claim 7, wherein the turntable is a polygon.

10. The system of claim 7, wherein the turntable includes a plurality of segments joined at an axis of rotation and at least one of the plurality of multi-axis motion devices is mounted in a fixed position on an end of one of the plurality of segments opposite the axis of rotation.

11. The system of claim 7, wherein the system further comprises a plurality of motion devices and each of the motion devices is provided on the turntable a pre-defined distance from an axis of rotation.

12. The system of claim 7, further comprising at least one sensor configured to provide position information of at least one of the plurality of motion devices.

13. The system of claim 7, wherein at least one of the multi-axis motion devices is configured to actuate about four axes.

14. The system of claim 7, wherein the processor is further configured to synchronize movement of the motion device controller with an audio signal.

15. The system of claim 7, further comprising a user interface wherein the ride experience command sequence is provided to the ride control system via the user interface.

16. The system of claim 7, wherein the turntable motor controller is configured to move the turntable at a pre-defined rate.

17. The system of claim 7, wherein the turntable motor controller is configured to move the turntable at timed intervals.

18. The system of claim 7, wherein the turntable motor controller is configured to manipulate the turntable in a sequence of movements synchronized with manipulation by the motion device controller of a motion device into different positions from a starting position.

19. A computer-implemented method comprising:
    receiving a ride experience command sequence;
    using a turntable motor controller to manipulate a turntable to execute a ride experience command sequence;
    displaying media on a plurality of media domes; and
    using a motion device controller to manipulate a plurality of multi-axis motion devices to execute the ride experience command sequence, wherein the ride experience command sequence includes manipulating a first multi-axis motion device in synchronization with media and the command sequence includes rotating the first multi-axis motion device to a first one of the plurality of media domes and, subsequently, rotating a second multi-axis motion device to the first one of the plurality of media domes.

20. The system of claim 1, wherein at least one of the media domes includes a concave surface adapted to curve around at least a portion of at least one of the multi-axis motion devices.

21. The system of claim 20, wherein each multi-axis motion device has a respective dedicated media dome.

* * * * *